US011228492B2

(12) United States Patent
Hershberg et al.

(10) Patent No.: US 11,228,492 B2
(45) Date of Patent: Jan. 18, 2022

(54) DEBUGGING A NETWORK SWITCH BY REPLAYING CONFIGURATION

(71) Applicant: Red Hat Israel, Ltd., Ra'anana (IL)

(72) Inventors: Joshua Hershberg, Raanana (IL); Michael Kolesnik, Raanana (IL)

(73) Assignee: Red Hat Israel, Ltd., Ra'anana (IL)

( * ) Notice: Subject to any disclaimer, the term of this patent is extended or adjusted under 35 U.S.C. 154(b) by 10 days.

(21) Appl. No.: 16/242,774

(22) Filed: Jan. 8, 2019

(65) Prior Publication Data
US 2020/0220778 A1    Jul. 9, 2020

(51) Int. Cl.
*H04L 12/24* (2006.01)
*H04L 12/26* (2006.01)
*H04L 12/931* (2013.01)

(52) U.S. Cl.
CPC ...... *H04L 41/0853* (2013.01); *H04L 41/0806* (2013.01); *H04L 43/50* (2013.01); *H04L 49/70* (2013.01)

(58) Field of Classification Search
CPC . H04L 41/0853; H04L 41/0806; H04L 43/50; H04L 49/70
USPC .......................................................... 370/244
See application file for complete search history.

(56) References Cited

U.S. PATENT DOCUMENTS

| | | | |
|---|---|---|---|
| 9,054,975 B2 | 6/2015 | Feldmann et al. | |
| 2011/0022695 A1* | 1/2011 | Dalal | H04L 69/32 709/222 |
| 2014/0337674 A1 | 11/2014 | Ivancic et al. | |
| 2015/0100704 A1* | 4/2015 | Davie | G06F 9/45533 709/238 |
| 2016/0021032 A1* | 1/2016 | Maier | H04L 49/70 370/401 |
| 2018/0062923 A1* | 3/2018 | Katrekar | H04L 41/12 |
| 2018/0063731 A1* | 3/2018 | Ashrafi | H04B 10/1123 |
| 2018/0367371 A1* | 12/2018 | Nagarajan | H04L 43/0811 |
| 2019/0222511 A1* | 7/2019 | Lokman | H04L 41/0803 |

FOREIGN PATENT DOCUMENTS

CN         107645472 A        1/2018

OTHER PUBLICATIONS

Bakhshi "User-Centric Traffic Engineering in Software Defined Networks", Research Degrees with Plymouth University, Jan. 2017, 328 pages.

(Continued)

*Primary Examiner* — Kibrom T Hailu
*Assistant Examiner* — Nizam U Ahmed
(74) *Attorney, Agent, or Firm* — Womble Bond Dickinson (US) LLP

(57) ABSTRACT

A network switch may be debugged by creating a virtual instance of the switch. Configuration data of the network switch may be retrieved, the configuration data including lists of the rules and groups configured on the switch. An isolated virtual environment may be created, and a virtual switch may be provisioned on the isolated virtual environment. The virtual switch may be configured with the configuration data of the network switch, including the rules and groups configured thereon. Diagnostic data corresponding to the switch may be obtained from the virtual switch.

18 Claims, 6 Drawing Sheets

(56) References Cited

OTHER PUBLICATIONS

Joestringer et al. "SDN-Survey/latex", https://github.com/SDN-Survey/latex/blob/master/text/4_sdn_in_layers.tex, Oct. 7, 2014, 30 pages.
Wundsam et al. "OFRewind: Enabling Record and Replay Troubleshooting for Networks", Deutsche Telekom Laboratories / TU Berlin; Deutsche Telekom Inc., R&D Lab USA, 2011, 14 pages.

* cited by examiner

DEBUGGING A NETWORK SWITCH BY REPLAYING CONFIGURATION

TECHNICAL FIELD

Aspects of the present disclosure relate to network switches, and more particularly, to the debugging of network switches.

BACKGROUND

Network switches are devices that connect different devices together on a network by using packet switching to receive, process, and forward data to the destination device. An OpenFlow™ switch is a programmable network switch that forwards packets in a software-defined networking (SDN) environment. OpenFlow™ switches may be implemented as a software program or hardware device and are either based on the OpenFlow™ switching protocol or compatible with it. The OpenFlow™ Switching Protocol is defined by the OpenFlow™ Switch Consortium in the OpenFlow™ Switch Specification, and is intended as a way for researchers to run experimental protocols in their networks.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
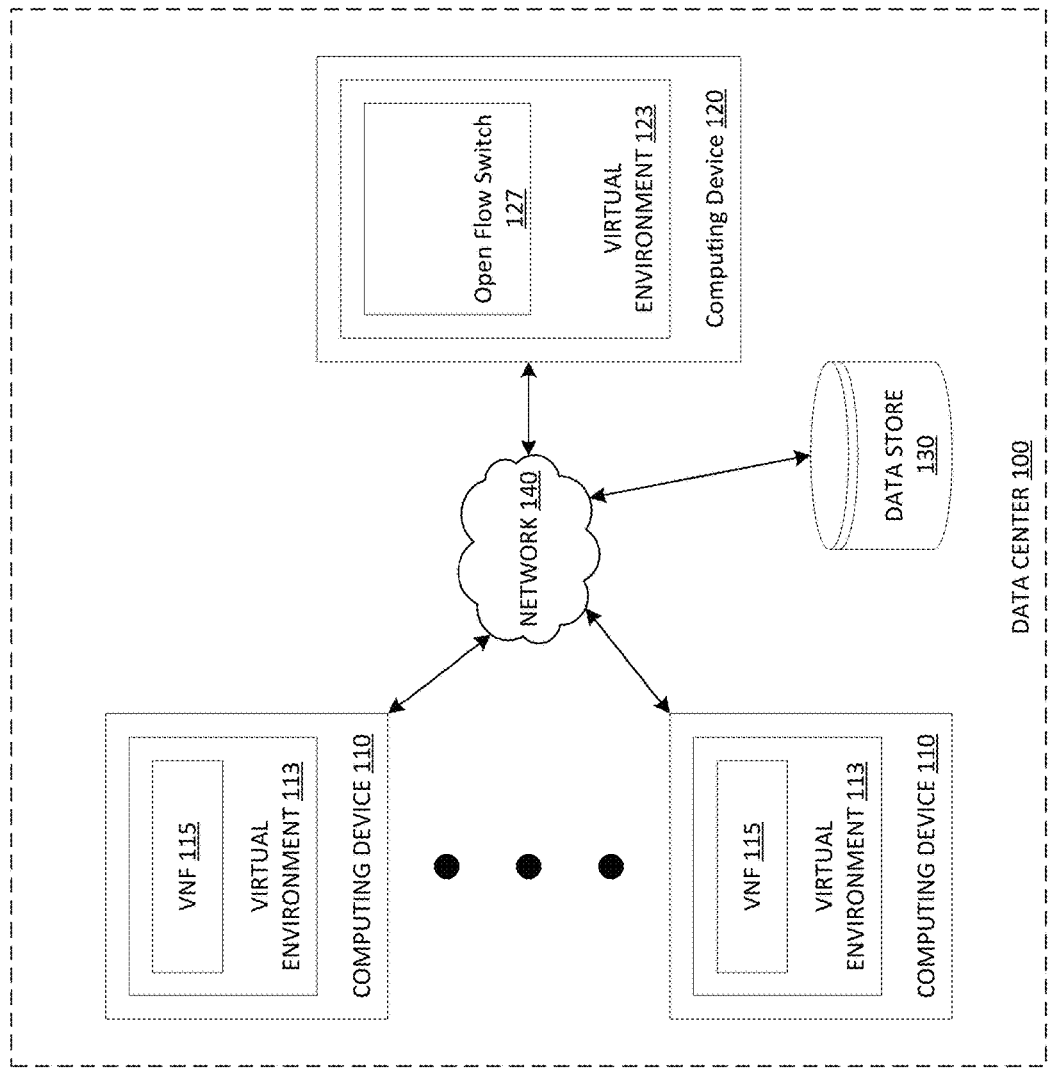
FIG. 1 is a block diagram that illustrates an example data center, in accordance with some embodiments of the present disclosure.

OpenFlow™ network switches may be configured with rules, also known as flows, and groups. Rules may be considered as criteria that packets are matched against, such as header values that can be used to match against packet headers. Each rule may be associated with one or more actions to apply to packets that match with the rule. For example, if a packet matches with a rule, an associated action might be to forward the packet to a specified port. Actions may be collected in groups, and groups may in turn also be associated with a particular rule. In addition, groups of actions may have dependencies on one another. For example, before a first group of actions can be applied to a packet that has matched a rule, a second group of actions may need to be applied to that rule. Thus, the first group depends from the second group.

As with many network functions, switching devices can be virtualized, and included as part of a software defined network (SDN). Network functions virtualization (NFV) implements network functions as virtual machines (VMs) on a general-purpose, cloud-based infrastructure, rather than as dedicated physical hardware. By using a single infrastructure for all the virtual network functions (VNFs) in a SDN, organizations can drastically reduce capital expenses (CapEx) and operational expenses (OpEx) through increased system utilization and streamlined administration.

As discussed above, OpenFlow™ switches can be programmed with rules and groups (of actions) to perform packet routing and other essential functions. Many OpenFlow™ switches provide tools for debugging them. For example, OpenFlow™ switches may provide diagnostic data indicating, among other statistics, the number of times a rule matched with a packet. In addition, OpenFlow™ switches may provide rule evaluation simulations using mock packets injected into the switch. Despite this, it is generally easier to debug a live running system than to determine problems based on logs and/or diagnostic data alone. In addition, a typical cloud usage of OpenFlow™ switches may include large numbers of switches containing thousands of rules, where each rule may be expressed as a network level field specification with non-standard extension fields, which may make them difficult to read. In such scenarios, debugging an OpenFlow™ switch can be difficult and complex. Further, in many scenarios, the actual cloud environment is usually not accessible to a person debugging a switch.

The present disclosure addresses the above-noted and other deficiencies by using a processing device to create a virtual instance of an existing OpenFlow™ switch, the virtual instance being configured with the rules and groups of the existing OpenFlow™ switch. The processing device may obtain configuration data from the OpenFlow™ switch using standard OpenFlow™ protocol constructs. The configuration data may include a list of all ports attached to the OpenFlow™ switch, a media access control (MAC) address and an interne protocol (IP) address for each port attached to the OpenFlow™ switch, a list indicating one or more groups configured on the OpenFlow™ switch, and a list of the rules configured on the OpenFlow™ switch. The processing device may then create an isolated virtual environment that is not connected to any other network device or component, virtual or otherwise. The isolated virtual environment may be a virtual machine (VM) or a container. The processing device may provision a virtual switch on the isolated virtual environment and configure the virtual switch with the configuration data, including the rules and groups configured on the OpenFlow™ switch. This results in a fully functional virtual instance of the existing OpenFlow™ switch which may be debugged in real time using virtual switch diagnostic tools and OpenFlow™ diagnostic tools. For example, the processing device may inject packet traffic into the virtual ports of the virtual switch and observe rule statistics (i.e. the number of times a packet matched with a rule). Although discussed in terms of an OpenFlow™ switch, embodiments of the present disclosure may be applied to the debugging of any rule/group-based switch.

FIG. 1 is a block diagram that illustrates an example data center 100. As illustrated in FIG. 1, the data center 100 includes a plurality of computing devices 110 and 120, a data store 130, and a network 140. The computing devices 110, the computing device 120, and the data store 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers (e.g. cell towers), etc. The network 140 may carry communications (e.g., data, message, packets, frames, etc.) between computing devices 110 and 120, and the data store 130. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each computing device may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 110 may comprise any suitable type of computing device or machine that has a programmable processor including, for example, server computers, desktop computers, laptop computers, tablet computers, smartphones, set-top boxes, etc. In some examples, the computing devices 110 and 120 may comprise a single machine or may include multiple interconnected machines (e.g., multiple servers configured in a cluster). The computing devices 110 and 120 may be implemented by a common entity/organization or may be implemented by different entities/organizations. For example, a first computing device 110 may be operated by a first company/corporation and a second computing device 110 may be operated by a second company/corporation. Each computing device 110 and 120 may execute or include an operating system (OS), as discussed in more detail below. The OS of a computing device 110 and 120 may manage the execution of other components (e.g., software, applications, etc.) and/or may manage access to the hardware (e.g., processors, memory, storage devices etc.) of the computing device.

As illustrated in FIG. 1, each computing device 110 includes a virtual environment 113. In some embodiments, a virtual environment 113 may be a virtual machine (VM) that may execute on a hypervisor (shown in FIG. 2A) which executes on top of the OS for a computing device, as discussed in more detail below. The hypervisor may manage system resources (including access to hardware devices, such as processors, memories, storage devices), as discussed in more detail below. The hypervisor may also emulate the hardware (or other physical resources) which may be used by the VMs to execute software/applications, as discussed in more detail below. In another embodiment, a virtual environment 113 may be a container that may execute on a container engine which executes on top of the OS for a computing device, as discussed in more detail below. The container engine may allow different containers to share the OS of a computing device (e.g., the OS kernel, binaries, libraries, etc.), as discussed in more detail below. The container engine may also perform other functions, as discussed in more detail below. The virtual environment 113 may be isolated, in that it is not connected to any other device or component of data center 100, whether virtual or otherwise.

In some embodiments, a network virtualization platform (illustrated in FIGS. 2A and 2B), such as RedHat™ OpenStack™, may also execute on the OS of the computing device. The network virtualization platform may use a consistent set of application programming interfaces (APIs) to abstract those virtual resources provided by the hypervisor one step further into discrete pools that may be used to configure and deploy a virtual environments (e.g., virtual environment 113) and virtual network functions (VNFs) (e.g., VNF 115) that administrators and users may interact with directly. The network virtualization platform may include a deployment controller to handle creation of virtual environments (including VMs and containers) as well as provisioning of such virtual environments with VNFs. The deployment controller may also function to manage the operations of the VNFs. For example, the network virtualization platform may utilize the deployment controller to create virtual switches (and a virtual environment for the switch to run on) as well as manage the operations of the virtual switch (e.g., configuring/modifying rules and groups, managing connections with other VNFs and handling diagnostic tasks).

As further illustrated in FIG. 1, each virtual environment 113 includes a VNF 115. For example, VNF 115 may execute in a VM or a container. Although one VNF 115 is illustrated in a respective virtual environment 113, a virtual environment 113 may include multiple VNFs 115 in other embodiments. In addition, each computing device 110 in the network 100 may use the same type or different types of virtual environments 113. For example, each virtual environment 113 may be a VM. In another example, each virtual environment 113 may be a container. In a further example, some of the virtual environments 113 may be VMs and other virtual environments 113 may be containers. VNFs 115 may be deployed and managed by a deployment controller (not illustrated in the figures) executing as part of a network virtualization platform.

Each virtual environment 113 may include a runtime environment (not illustrated in the figures). A runtime environment may refer to a configuration of hardware and/or software that supports the execution of different types of applications which may be written in different programming languages. Different runtime environments may allow/use different programming languages and/or different versions of programming languages. The runtime environments for the virtual environments 113 may be different. In one embodiment, a first runtime environment may use a different programing language than a second runtime environment. For example, a first runtime environment may use JavaScript and a second runtime environment may use Python. In another embodiment, a first runtime environment may use a different version of a programming language than a second runtime environment. For example, a first runtime environment may use JavaScript version 5.1 and a second runtime environment may use JavaScript version 6. In a further embodiment, a first runtime environment may use different libraries and/or different version of libraries than a second runtime environment. For example, a first runtime environment may use AngularJS (e.g., a JavaScript based library) and a second runtime environment may use React (a different JavaScript based library). In another example, a first runtime environment may use AngularJS version 1.5 and a second runtime environment may use AngularJS version 4.

The computing device 120 includes a virtual environment 123 (e.g., a VM, a container, etc.), upon which an OpenFlow™ switch 127 may run. The operations of OpenFlow™ switch 127 may be managed by a deployment controller (not illustrated in the figures) that executes as part of a network virtualization platform as discussed above. In some embodiments, the deployment controller may monitor and record configuration data such as a list of all ports attached to the OpenFlow™ switch 127, a media access control (MAC) address and an internet protocol (IP) address for each port attached to the OpenFlow™ switch 127, a list indicating one or more groups configured on the OpenFlow™ switch 127, and a list of the rules configured on the OpenFlow™ switch 127. The lists may be retrievable from the OpenFlow™ switch 127 using standard OpenFlow™ protocol constructs. However, retrieval of MAC and IP addresses may depend on the nature of the runtime environment of virtual environment 123. For example, if the runtime environment is an OpenStack™ runtime environment, MAC and IP addresses may be retrievable in the form of data structures corresponding to virtual ports. Although illustrated as a virtual component running on a separate computing device in FIG. 1, OpenFlow™ switch 127 may also be implemented on a virtual environment 113 running on any computing device 110, or alternatively may be implemented in hardware separate from any computing device 110.

As discussed above, by allowing the components of the data center 100 to operate within different virtual environments, each component of the network may be implemented using a different programming language/version of a programming language and may execute within a different runtime environment in a virtual environment. This allows different developers to use their preferred programming language when developing components of the network 100 and may also allow networks to be developed more easily among larger teams of developers (since each team of developers may develop their respective components without coordinating the programming language/version with the other teams). This further allows the networks to be updated/scaled up more easily since new components may be added more easily.

Figure 2B:
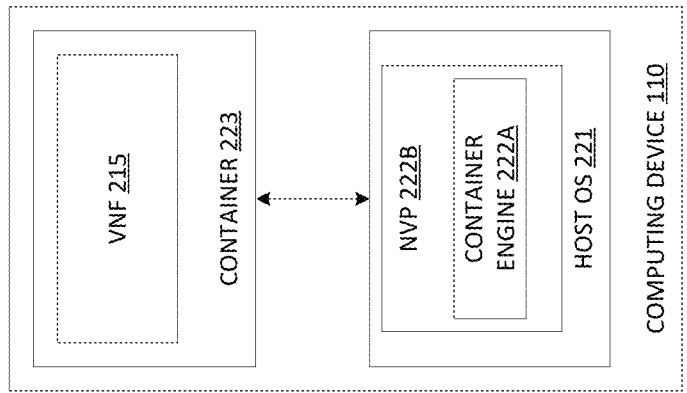
FIG. 2B is a block diagram that illustrates an example virtual environment executing within a computing device, in accordance with some embodiments of the present disclosure.
Figure 2A:
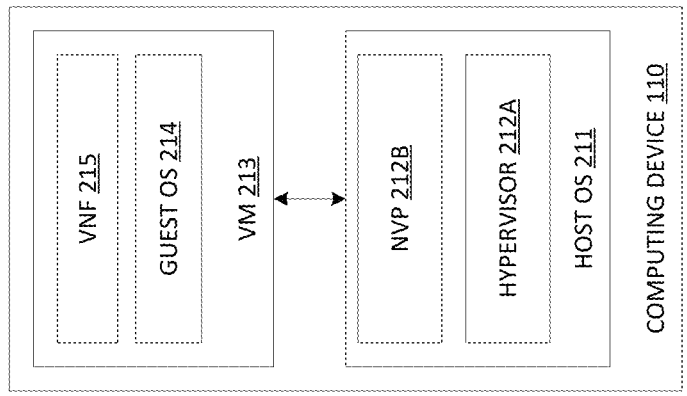
FIG. 2A is a block diagram that illustrates an example virtual environment executing within a computing device, in accordance with some embodiments of the present disclosure.

FIG. 2A is a block diagram that illustrates an example virtual environment executing within a computing device 110, in accordance with some embodiments of the present disclosure. The computing device 110 may include hardware (e.g., processing devices, memory, storage devices, other devices, etc.) and a host OS 211. As discussed above, one type of a virtual environment may be a VM 213 executing on a computing device 110. In one embodiment, the VM 213 may be a software implementation of a machine (e.g., a software implementation of a computing device) that includes its own operating system (referred to as guest OS 214) and executes application programs, applications, and software such as VNFs. VM 213 may be, for example, a hardware emulation, a full virtualization, a para-virtualization, and an operating system-level virtualization VM.

Computing device 110 may include a hypervisor 212A, which may also be known as a virtual machine monitor (VMM). In the example shown, hypervisor 212A may be a component of a host operating system 211. In another example, hypervisor 212A may run on top of a host operating system 211, or may run directly on host hardware without the use of a host operating system 211. Hypervisor 212A may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 212A, though typically implemented in software, may emulate and export a bare machine interface to higher level software in the form of virtual processors and guest memory. Higher level software may comprise a standard or real-time operating system (OS), may be a highly stripped down operating environment with limited operating system functionality, and/or may not include traditional OS facilities, etc. For example, higher level software may be a network virtualization platform 212B such as RedHat™ OpenStack™, as discussed above. Hypervisor 212A may present other software (i.e., "guest" software) the abstraction of one or more virtual machines (VMs) that provide the same or different abstractions to various guest software (e.g., guest operating system, guest applications).

VM 213 may execute guest software that uses an underlying emulation of the physical resources (e.g., virtual processors and guest memory). As illustrated in FIG. 2A, VM 213 may execute a VNF 115 (e.g., a component/part of a larger network), such as a virtual switch, within a runtime environment (not shown in the figures). Both the VM 213 and the VNF 115 may be configured and deployed by a network virtualization platform 212B executing atop the host OS 211, as discussed above. The network virtualization platform 212B, via the computing device 110 may provide administrators and users with the capability to virtualize a variety of network functions.

FIG. 2B is a block diagram that illustrates an example virtual environment executing within a computing device, in accordance with some embodiments of the present disclosure. The computing device 110 may include hardware (e.g., processing devices, memory, storage devices, other devices, etc.) and a host OS 221. As discussed above, one type of a virtual environment may be a container 223 executing on a computing device 110. In one embodiment, the container 223 may be an isolated set of resources allocated to executing an application, software, and/or process independent from other applications, software, and/or processes. The host OS 221 may use namespaces to isolate the resources of the containers from each other. In another embodiment, the container 223 may be a virtualized object similar to virtual machines. However, container 223 may not implement separate guest OS (like VM 213 illustrated in FIG. 2A). The container 223 may share the kernel, libraries, and binaries of the host OS 221 with other containers that are executing on the computing device 110. Although FIG. 2B illustrates one container 223, the computing device 110 may include multiple containers in other embodiments. Each container may have one or more respective, filesystems, memories, devices, network ports, etc., for accessing the physical resources of the computing device 110.

In one embodiment, the container engine 222A may allow different containers to share the host OS 221 (e.g., the OS kernel, binaries, libraries, etc.) of the computing device 110. For example, the container engine 222A may multiplex the binaries and/or libraries of the host OS 221 between multiple containers. The container engine 222A may also facilitate interactions between the container and the resources of the computing device 110. For example, the container engine 222A may manage requests from container 223 to access a memory (e.g., a RAM) of the computing device 110. In another example, the container engine 222A may manage requests from the container 223 to access certain libraries/binaries of the host OS 223. In other embodiments, the container engine 222A may also be used to create, remove, and manage containers. In one embodiment, the container engine 222A may be a component of a host operating system 221. In another embodiment, container engine 222 may run on top of a host operating system 221, or may run directly on host hardware without the use of a host operating system 221. In yet other embodiments, container engine 222A may be a component of network virtualization platform 222B (as illustrated in FIG. 2B), that runs on host OS 211.

As illustrated in FIG. 2B, VNF s15 (e.g., a component/part of a larger network) may execute within the container 223. For example, the VNF 115 may execute within a runtime environment (not shown in the figures) of the container 223. Both the container 223 and the VNF 215 may be created by a network virtualization platform 222B. The network virtualization platform 222B may run on the host OS 211 and in some embodiments the container engine 222A may b a component of the network virtualization platform 222B. The network virtualization platform 222B, via the computing device 110 may provide administrators and users with the capability to configure and deploy a variety of network functions within containers.

Figure 3:
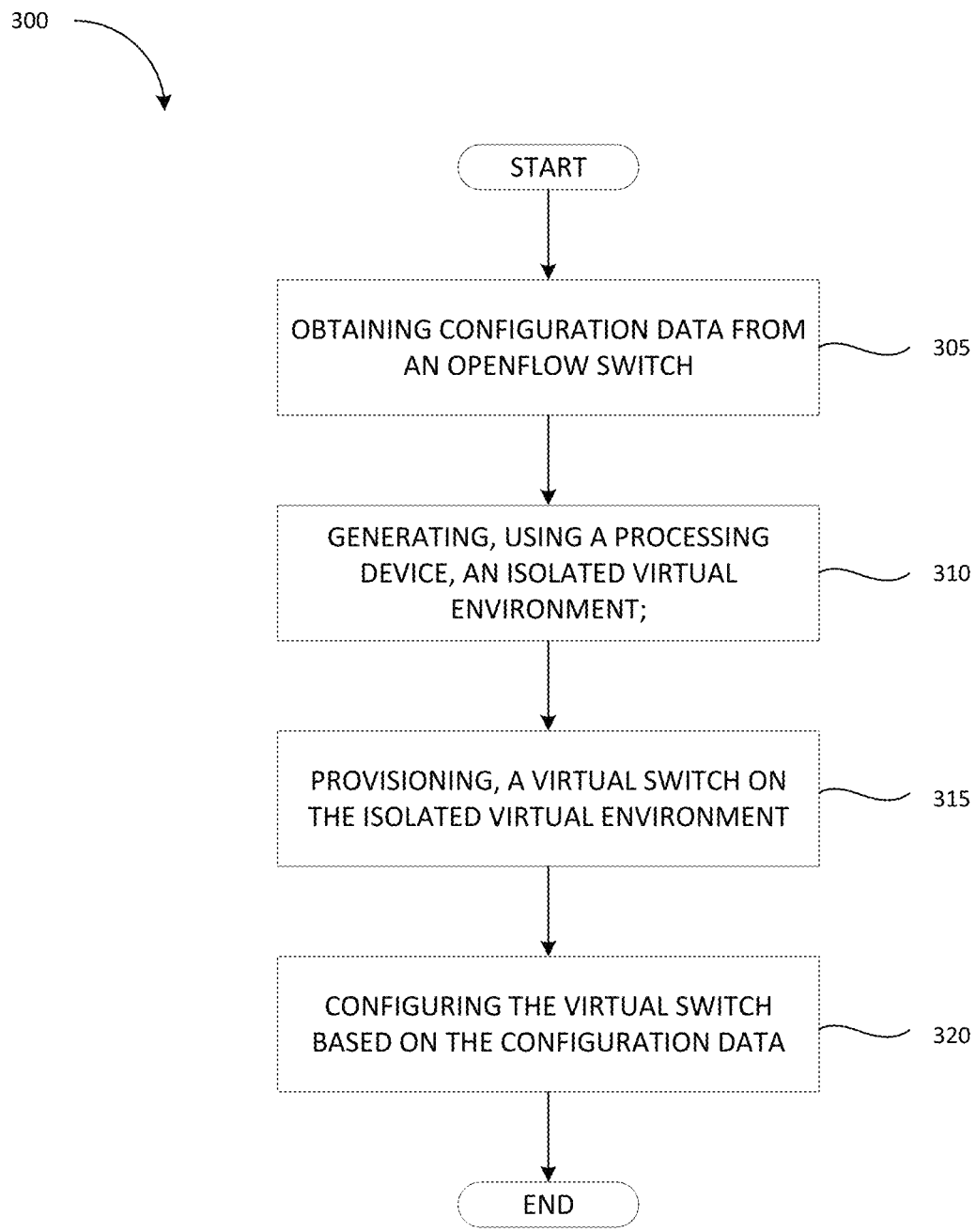
FIG. 3 is a flow diagram of a method of debugging a network switch, in accordance with some embodiments of the present disclosure.

FIG. 3 is a flow diagram of a method 300 of debugging an OpenFlow™ switch, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a computing device (e.g., computing device 110 illustrated in FIG. 1).

The method 300 begins at block 305, where the computing device 110 may obtain configuration data from an existing OpenFlow™ switch (e.g., OpenFlow™ switch 127 illustrated in FIG. 1). As discussed above, computing device 110 may utilize a network virtualization platform such as RedHat™ OpenStack™ which may include a deployment controller to configure and deploy virtual environments as well as instances of VNFs atop those virtual environments. The deployment controller may also manage the operations of the VNFs. Computing device 110 may utilize standard OpenFlow™ protocol constructs in order to obtain the configuration data from the OpenFlow™ switch. However, retrieval of MAC and IP addresses may depend on the nature of the runtime environment of virtual environment 123. For example, if the runtime environment is an OpenStack™ runtime environment, MAC and IP addresses may be retrievable in the form of data structures corresponding to virtual ports. The configuration data may include a list of all ports attached to the OpenFlow™ switch, a media access control (MAC) address and an interne protocol (IP) address for each port attached to the OpenFlow™ switch, a list indicating one or more groups configured on the OpenFlow™ switch, and a list of the rules configured on the OpenFlow™ switch. In some embodiments, the configuration data may include a packet capture that includes packet traffic that was injected into a port of the OpenFlow™ switch. At block 310, computing device 110 may create an isolated virtual environment (e.g., virtual environment 113), that acts as a stand-alone virtual environment. Computing device 110 may ensure that the isolated virtual environment has no connection to any other device or component of data center 100, including any other virtual environment 113 or any other computing device 110, and has no connection to the network 140. The isolated virtual environment may have access to the hardware resources needed to support a virtual switch instance and be restricted from any other resources. Computing device 110 may deploy the isolated virtual environment as a VM, or as a container, as discussed in further detail herein. At block 315, computing device 110 may subsequently provision a virtual switch on the isolated virtual environment and at block 320, may configure the virtual switch using the configuration data.

Figure 4:
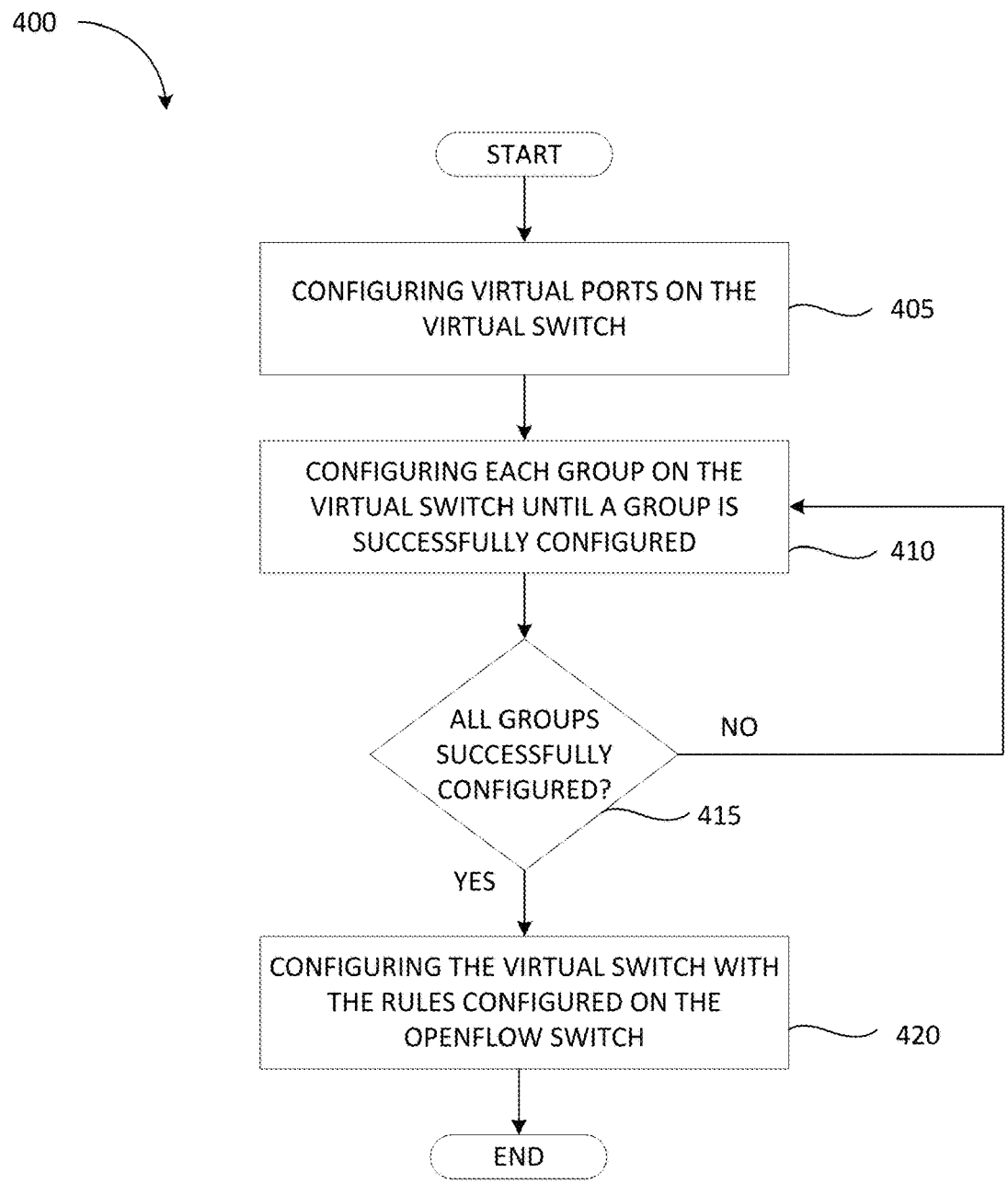
FIG. 4 is a flow diagram of a method of configuring a virtual switch, in accordance with some embodiments of the present disclosure.

FIG. 4 is a flow diagram of a method 400 of configuring a virtual switch with configuration data from an OpenFlow™ switch, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 110 illustrated in FIG. 1).

The method 400 begins at block 405, where for each port attached to the OpenFlow™ switch, the computing device 110 may create a corresponding virtual port and attach it to the virtual switch. Computing device 110 may create each virtual port as a TAP device, which may simulate a link layer device operating with layer two packets (e.g., Ethernet frames), thereby creating a network bridge. Computing device 110 may attach each such TAP device to the virtual switch. Computing device 110 may then configure each virtual port with the IP and MAC address of the corresponding OpenFlow™ switch port. At block 410, computing device 110 may configure the virtual switch with the groups configured on the OpenFlow™ switch. However, certain groups may depend on each other, and the list of groups obtained from the OpenFlow™ switch may not be ordered in view of these dependencies. If a first group depends on a second and third group, then the first group cannot be configured on the virtual switch until the second and third groups are configured. To overcome this, computing device 110 may iteratively attempt to configure each group in the list, until a group is successfully configured on the virtual switch. At block 415, upon successful configuration of a group, that group is removed from the list, and computing device 110 determines whether all groups have been successfully configured. If not, computing device 110 repeats the process (iteratively attempting to configure each group) with the remaining groups until another group is successfully configured on the virtual switch. Computing device 110 may continue in this fashion until all the groups have been successfully configured. At block 420, computing device 110 may configure the virtual switch with each of the rules from the list of the rules configured on the OpenFlow™ switch. Thus, the virtual switch is now a fully functional network virtualization of the OpenFlow™ switch.

Upon realizing the fully functional network virtualization of the OpenFlow™ switch, a user may (via computing device 110) obtain diagnostic data from the virtual switch. More specifically, the network virtualization platform may provide an interface to a user via the computing device 110 so that the user may obtain diagnostic data from the virtual switch. Diagnostic data may be obtained using standard network diagnostic tools and OpenFlow™ diagnostic tools. For example, a user may obtain rule matching statistics, which indicate the number of times a packet matched with one or more particular rules after mock packet traffic has been injected into the virtual switch. In addition, a user may utilize rule evaluation simulators, such as the trace function defined by the OpenFlow™ protocol, which may inject mock packets into the virtual switch to see which rules they match with. Users can also attempt to modify certain rules and see how packet traffic is affected. Further, a user can also utilize standard network diagnostic tools such as tcpdump and ping etc. In some embodiments, the configuration data includes a packet capture that includes packet traffic injected into the OpenFlow™ switch, and the corresponding ports the packet traffic was injected into. Thus, a user may utilize the packet capture to re-inject the packet traffic into the corresponding virtual ports of the virtual switch so as to allow for observation of which rules the packets match with and recording of matching statistics etc. In this way, any bugs or issues affecting the OpenFlow™ switch can be recreated on the virtual switch.

Figure 5:
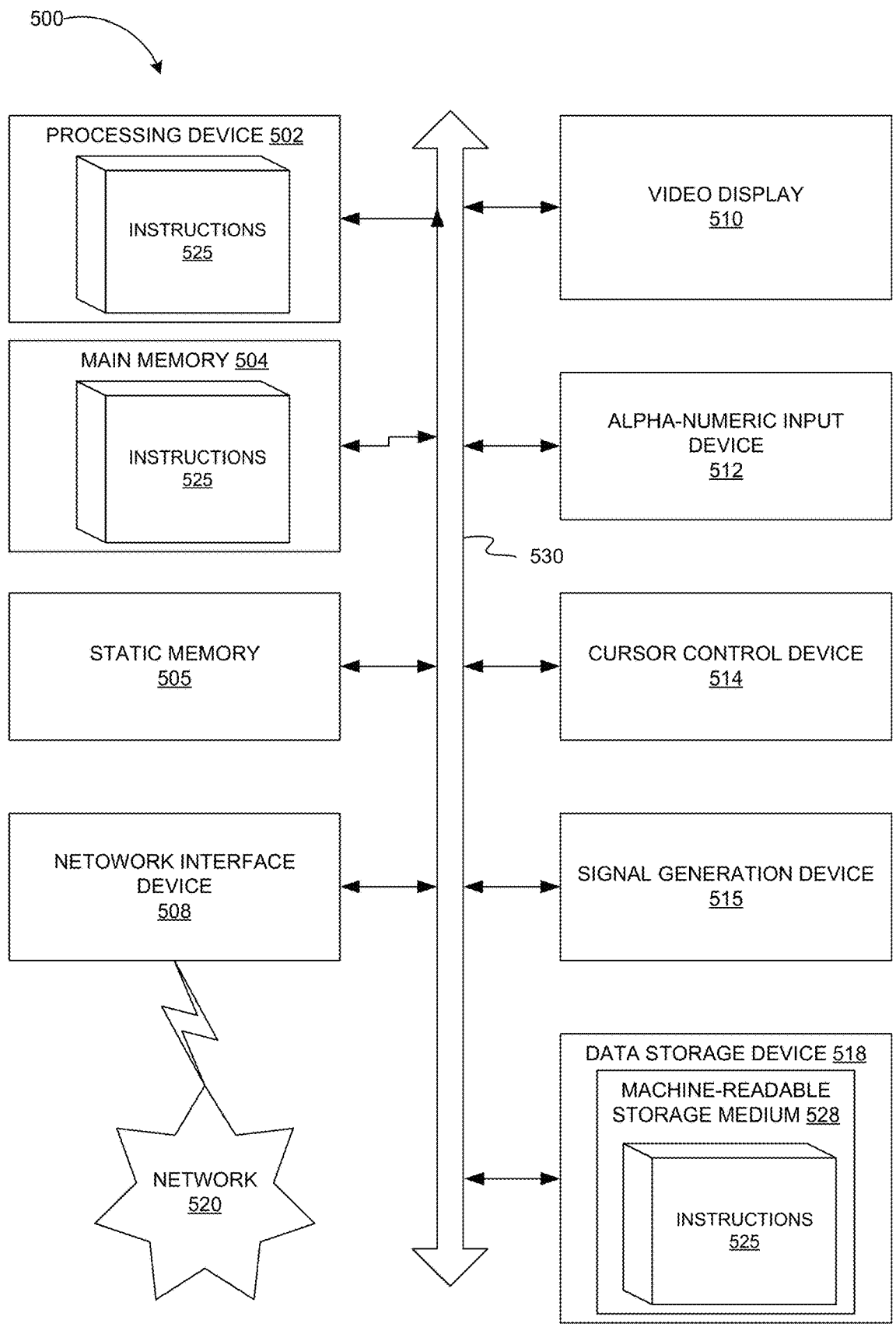
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., instructions for carrying out the operations described herein, in accordance with one or more aspects of the present disclosure. Instructions implementing module 526 may also reside, completely or at least partially, within main memory 504 and/or within processing device 502 during execution thereof by computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 6:
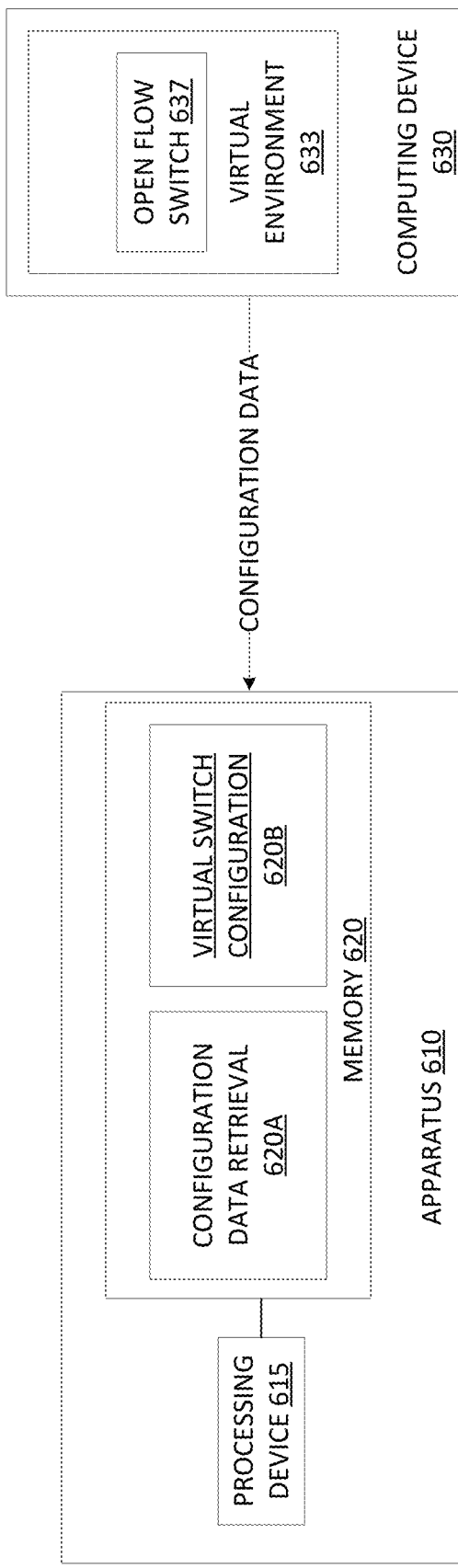
FIG. 6 is a block diagram of an example apparatus that may perform one or more of the operations described herein, in accordance with some embodiments of the present disclosure.

FIG. 6 is a block diagram of an example apparatus 610 that may perform one or more of the operations described herein, in accordance with some embodiments. The apparatus 600 includes a memory 620 to store a configuration data retrieval component 620A and a virtual switch configuration component 620B. The apparatus 600 also includes a processing device 615 operatively coupled to the memory. The processing device 615 may execute the configuration data retrieval component 620A to obtain, from an OpenFlow™ switch 637, a set of configuration data including the rules and groups configured on the OpenFlow™ switch 637. The processing device 615 may then execute virtual switch configuration component 620B to create an isolated virtual environment and provision a virtual switch instance on the isolated virtual environment. The processing device 615 may configure the virtual switch using the configuration data retrieved from the OpenFlow™ switch 637. The processing device 615 may then obtain diagnostic data from the virtual switch.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the embodiments to the precise forms disclosed. Many modifications and variations are possible in view of the above teachings. Accordingly, the present embodiments are to be considered as illustrative and not restrictive, and the invention is not to be limited to the details given herein, but may be modified within the scope and equivalents of the appended claims.

What is claimed is:

1. A method comprising:
    obtaining, by a processing device, configuration data of a network switch, the configuration data comprising a list indicating one or more groups of actions configured on the network switch, packet capture data of the network switch, and a list of rules configured on the network switch;
    generating, by the processing device, an isolated virtual environment;
    provisioning, by the processing device, a virtual switch on the isolated virtual environment;
    configuring, by the processing device, the virtual switch in view of the configuration data, wherein the virtual switch corresponds to a virtual instance of the network switch; and
    debugging the virtual switch in real time using one or more diagnostic tools to inject the packet capture data into the virtual switch.

2. The method of claim 1, wherein the configuration data for the network switch further comprises: a list of one or more ports attached to the network switch and a media access control (MAC) address and an internet protocol (IP) address for each port attached to the network switch.

3. The method of claim 2, wherein the network switch is an OpenFlow™ switch and each list is obtained using standard OpenFlow™ protocol constructs.

4. The method of claim 1, wherein the isolated virtual environment comprises a container.

5. The method of claim 2, wherein configuring the virtual switch further comprises:
    for each of the one or more ports attached to the network switch, attaching a corresponding virtual port to the virtual switch and configuring the corresponding virtual port with the port's MAC address and IP address;
    iteratively, until each of the one or more groups of actions configured on the network switch is successfully configured on the virtual switch, attempting to configure each of the one or more groups of actions on the virtual switch until a group of action is successfully configured; and
    configuring the virtual switch with each of the rules configured on the network switch.

6. The method of claim 1, wherein the one or more diagnostic tools include network diagnostic tools and OpenFlow™ diagnostic tools.

7. A system comprising:
a memory;
a processing device operatively coupled to the memory, the processing device to:
obtain configuration data of a network switch, the configuration data comprising a list indicating one or more groups of actions configured on the network switch, packet capture data of the network switch, and a list of rules configured on the network switch;
generate an isolated virtual environment;
provision a virtual switch on the isolated virtual environment;
configure the virtual switch based on the configuration data, wherein the virtual switch corresponds to a virtual instance of the network switch; and
debug the virtual switch in real time using one or more diagnostic tools to inject the packet capture data into the virtual switch.

8. The system of claim 7, wherein the configuration data for the network switch further comprises: a list of one or more ports attached to the network switch, and a media access control (MAC) address and an internet protocol (IP) address for each port attached to the network switch.

9. The system of claim 8, wherein the network switch is an OpenFlow™ switch and wherein to obtain each list, the processing device is further to use standard OpenFlow™ protocol constructs.

10. The system of claim 7, wherein the isolated virtual environment is a container.

11. The system of claim 8, wherein to configure the virtual switch, the processing device is further to:
for each of the one or more ports attached to the network switch, attach a corresponding virtual port to the virtual switch and configure the corresponding virtual port with the port's MAC address and IP address;
iteratively, until each of the one or more groups of actions configured on the network switch is successfully configured on the virtual switch, attempt to configure each of the one or more groups of actions on the virtual switch until a group of action is successfully configured; and
configure the virtual switch with each of the rules configured on the network switch.

12. The system of claim 7, wherein the wherein the one or more diagnostic tools include network diagnostic tools and OpenFlow™ diagnostic tools.

13. A non-transitory computer-readable storage medium including instructions that, when executed by a processing device, cause the processing device to:
obtain configuration data of a network switch, the configuration data comprising a list indicating one or more groups of actions configured on the network switch, and a list of rules configured on the network switch;
generate an isolated virtual environment;
provision a virtual switch on the isolated virtual environment; and
configure, by the processing device, the virtual switch based on the configuration data, wherein the virtual switch corresponds to a virtual instance of the network switch; and
debug the virtual switch in real time using one or more diagnostic tools to inject the packet capture data into the virtual switch.

14. The non-transitory computer-readable storage medium of claim 13, wherein the configuration data for the network switch further comprises: a list of one or more ports attached to the network switch and a media access control (MAC) address and an internet protocol (IP) address for each port attached to the network switch.

15. The non-transitory computer-readable storage medium of claim 14, wherein the network switch is an OpenFlow™ switch and wherein to obtain each list, the processing device is further to use standard OpenFlow™ protocol constructs.

16. The non-transitory computer-readable storage medium of claim 13, wherein the isolated virtual environment is a container.

17. The non-transitory computer-readable storage medium of claim 14, wherein to configure the virtual switch, the processing device is further to:
for each of the one or more ports attached to the network switch, attach a corresponding virtual port to the virtual switch and configuring the corresponding virtual port with the port's MAC address and IP address;
iteratively, until each of the one or more groups of actions configured on the network switch is successfully configured on the virtual switch, attempt to configure each of the one or more groups of actions on the virtual switch until a group of action is successfully configured;
configure the virtual switch with each of the rules configured on the network switch.

18. The non-transitory computer-readable storage medium of claim 13, wherein the one or more diagnostic tools include network diagnostic tools and OpenFlow™ diagnostic tools.

* * * * *